US012299547B1

(12) United States Patent
Ogun et al.

(10) Patent No.: US 12,299,547 B1
(45) Date of Patent: May 13, 2025

(54) EDGE FILTERING OF MACHINE LEARNING TRAINING DATA

(71) Applicant: Amazon Technologies, Inc., Seattle, WA (US)

(72) Inventors: Denis Ogun, Cambridge (GB); Benjamin Jack Barash, Seattle, WA (US); Yves Albers Schoenberg, Seattle, WA (US); Hillel Moshe Saul Baderman, London (GB); Adam Mulligan, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/304,188

(22) Filed: Apr. 20, 2023

Related U.S. Application Data

(62) Division of application No. 15/967,365, filed on Apr. 30, 2018, now abandoned.

(51) Int. Cl.
| | | |
|---|---|---|
| *G06N 20/00* | (2019.01) | |
| *B64C 39/02* | (2023.01) | |
| *G06F 18/214* | (2023.01) | |
| *G06F 18/24* | (2023.01) | |
| *G06T 7/80* | (2017.01) | |
| *B64U 101/30* | (2023.01) | |

(52) U.S. Cl.
CPC ........... *G06N 20/00* (2019.01); *B64C 39/024* (2013.01); *G06F 18/214* (2023.01); *G06F 18/24* (2023.01); *G06T 7/80* (2017.01); *B64U 2101/30* (2023.01)

(58) Field of Classification Search
CPC .. H04N 19/147; H04N 19/177; H04N 19/172; H04N 19/85; H04N 19/46; H04N 19/103; H04N 19/19; G06N 20/00; B64C 39/024; G06F 18/214; G06F 18/24
See application file for complete search history.

(56) References Cited

U.S. PATENT DOCUMENTS

| | | | |
|---|---|---|---|
| 10,333,843 B2 * | 6/2019 | Jha | ......................... H04L 69/162 |
| 2004/0054661 A1 | 3/2004 | Cheung | |
| 2007/0087756 A1 * | 4/2007 | Hoffberg | .......... G06Q 10/06375 455/450 |

(Continued)

OTHER PUBLICATIONS

Office Action for U.S. Appl. No. 15/967,365, mailed on Dec. 6, 2022, Denis Ogun, "Edge Filtering of Machine Learning Training Data", 14 pages.

*Primary Examiner* — Shawn S An
(74) *Attorney, Agent, or Firm* — Athorus, PLLC

(57) ABSTRACT

A data processing solution for data generated by autonomous vehicles, unmanned aerial vehicles (UAVs), and other Internet of Things (IoT) devices may include a network of edge devices and one or more cloud servers to gather and process data. Initially, all data generated by the edge devices may be gathered, transported, and processed by the cloud server(s) to train machine learning models. The cloud server(s) may push machine learning (ML) models to the network of edge devices. Using the ML models running on the edge devices, the data gathered by the individual edge devices may be filtered by its relevance score, which correlates to the impact the data would have as training data. The relevance score is used by the edge device to identify the data to upload to the cloud.

20 Claims, 7 Drawing Sheets

(56) References Cited

U.S. PATENT DOCUMENTS

| | | | |
|---|---|---|---|
| 2014/0214812 A1* | 7/2014 | St. John | G06F 16/38 |
| | | | 707/723 |
| 2014/0279808 A1* | 9/2014 | Strassner | G06Q 10/06 |
| | | | 706/47 |
| 2016/0019469 A1 | 1/2016 | Petrov | |
| 2017/0220935 A1* | 8/2017 | Gerrard | G06Q 30/02 |
| 2018/0025274 A1* | 1/2018 | Beller | G06N 5/04 |
| | | | 706/46 |
| 2018/0218627 A1* | 8/2018 | Smith Lewis | G09B 5/125 |
| 2018/0239770 A1* | 8/2018 | Ghotbi | G06F 15/76 |
| 2018/0316555 A1* | 11/2018 | Salgueiro | H04L 67/34 |
| 2018/0357511 A1* | 12/2018 | Misra | G06N 5/025 |
| 2018/0365595 A1* | 12/2018 | Zhou | G06N 20/20 |
| 2019/0012924 A1 | 1/2019 | Beaurepaire | |
| 2019/0059037 A1 | 2/2019 | Nakata | |
| 2019/0164060 A1 | 5/2019 | Gulin | |
| 2022/0138213 A1 | 5/2022 | Knoll | |

* cited by examiner

EDGE FILTERING OF MACHINE LEARNING TRAINING DATA

PRIORITY

This application is a divisional of, and claims priority to, pending U.S. patent application Ser. No. 15/967,365, filed on Apr. 30, 2018, entitled "EDGE FILTERING OF MACHINE LEARNING TRAINING DATA", and is fully incorporated by reference herein.

BACKGROUND

With the increase in the number of autonomous vehicles, unmanned aerial vehicles (UAVs), and other Internet of Things (IoT) devices, our vehicles and devices are getting smarter while generating copious amounts of data with their technological advances. In many cases, the data generated by the IoT devices may be collected and processed to train machine learning (ML) models, and the trained ML models may be fed back to the IoT devices themselves to help improve their performance in a continuous data loop. For example, data generated by the cameras and other sensors for a UAV may be collected and used as training data for ML models to improve the UAV's self-navigating ability while performing collision detection and object recognition. However, due to the amount of pure data generated by the increasing complexity of more advanced autonomous land or aerial vehicles and other IoT devices with additional sensors or higher resolution cameras, each individual IoT device may generate vast quantities of data, such that the cost of transporting and processing the data in cloud solutions increases exponentially with each device added. For example, in order for a large fleet of delivery UAVs to be feasible, a service provider may be tasked with finding a solution to reduce the cost and energy required to transport data collected from the fleet of UAVs to the cloud servers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
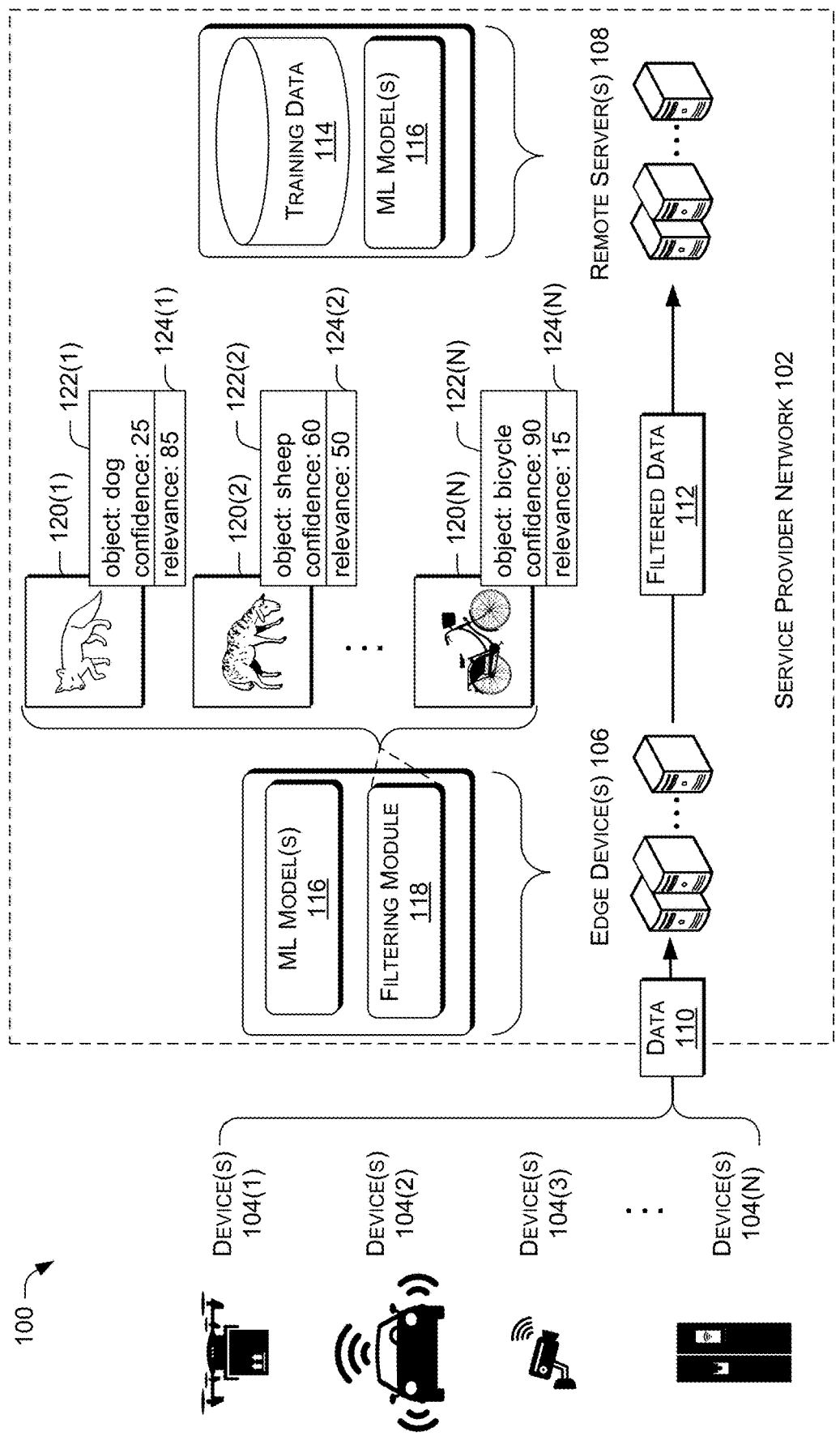
FIG. 1 is a schematic diagram illustrating an example data processing system showing aspects of a service provider network including a network of edge devices that filters machine learning training data for cloud servers.

This disclosure is directed to a data processing system that leverages a network of edge devices to collect and filter data generated by Internet of Things (IoT) devices, before transporting at least some of the filtered data to a cloud or remote server for processing, to reduce the costs and energy required to train machine learning models. Initially, data generated by autonomous vehicles, unmanned aerial vehicles (UAVs), and other IoT devices may be transported to a cloud server to train a machine learning model. With initial training data sets, the cloud server may train one or more machine learning (ML) model(s) to filter data based on the usefulness of the data, or the level of impact the data may have on improving the ML model. The cloud server may deploy the latest version of the trained ML model(s) to a network of edge devices to have the edge devices filter out useless data or data having little to no impact on the current ML models. The edge devices running the trained models may classify the data by relevance level based on whether the data may be useful as training data. Based on the data being classified at a relevance level that satisfies a relevance threshold, the data may be transported to the cloud servers for processing.

It is to be appreciated that, over time, the amount of data generated by autonomous vehicles, UAVs, and other IoT devices can become quite large as the number and the complexity of the devices increases. With the availability of vast quantities of IoT data, which may be transported and processed in the cloud, ML models can be trained on the data to improve the functions of the corresponding devices. Additionally, with the collection of IoT data, machine learning models can also be trained to classify unknown data as a type of data among different types of data that correspond to different levels of meaningful impact to the ML models. For example, the machine learning model(s) may be trained using training data that includes samples of IoTs data labeled with different relevance levels corresponding to different levels of impact the data may have as training data. Once trained, these machine learning model(s) can be pushed to edge devices to filter data by classifying gathered data into the different relevance levels. Based on the relevance score or relevance level of the data, the edge devices may determine the appropriate data transport method. For example, if the image data from a particular UAV is classified as highest level of relevance, the edge device may determine that the data should be transmitted over the network to the cloud servers right away. However, if the data is classified as less than the highest level of relevance, then the edge device may select from any number of alternative data transport methods available to that edge device location, including but not limited to queueing the data to be transmitting over the network during slower network use times or storing data onto a local storage hardware for physical transported, among other options.

Implementations of the techniques and systems described herein can improve existing technologies (e.g., data processing technologies), and can improve the functioning of the systems with respect to conventional systems. In particular, the implementations described herein allow a data processing system that runs trained ML models on a network of edge devices to filter the vast quantities of collected data at the edge devices. By locating or using the data filter at the individual edge devices, this improves the data processing pipeline by providing a feasible solution for processing the vast quantities of data generated by large fleets of autonomous systems. Additionally, this provides a better-performing network-based data processing system that mitigates the adverse impacts noted above, such as reducing the cost and energy required to collect and process the vast quantities of IoT data needed to train ML models. Resources, such as processing resources, may also be conserved by, for example, refraining from evaluating sensor data in cases where it doesn't make sense to do so (e.g., in cases where the data is classified as having very little to no impact as training data). Additionally, by filtering useful data to transmit to cloud servers, network usage is reduced. These techniques will be described in more detail below. Finally, the performance of the autonomous vehicles, UAVs, and other IoT devices is also improved by the techniques and systems described herein by improving the data processing pipeline, which pushes the more useful IoT data to the cloud to help speed up the ML model training process.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a schematic diagram illustrating an example data processing system 100 showing aspects of a service provider network including a network of edge devices that filters machine learning training data for remote servers. The example data processing system 100 (sometimes shorten herein to "system 100") may include Internet of Things (IoT) devices 104(1)-104(N) (individually and/or collectively referred to herein with reference IoT devices 104), where N is any integer greater than and/or equal to 2, that generates data to be collected and processed by the service provider network 102. The service provider network 102 may include a network of edge device(s) 106 and/or remote server(s) 108 that may be communicatively couple to the network in any manner, such as by a wired or wireless connection.

A service provider network 102 may represent a computing network configured to provide computing resources (which might be referred to simply as "resources") on a permanent or an as-needed basis. Among other types of functionality, the computing resources provided by the service provider network 102 can be utilized to implement various types of network services. The computing resources provided by the service provider network 102 can include data processing resources, data storage resources, virtual machine ("VM") instances, networking resources, data communication resources, network services, and other types of computing resources. The service provider network 102 can be accessed using an appropriate computing system, such as the IoT devices 104, the edge device(s) 106, and the remote server(s) 108 to communicate with the service provider network 102 over an appropriate data communications network.

The IoT devices 104 (sometimes called "devices," "smart devices," "autonomous vehicles." or "UAVs") may belong to individual consumer or entity subscribers (sometimes called "consumer," "subscriber," or "user") of the service provider network 102 or may belong to the service provider. Individual device(s) 104 may implement a communication module, which is stored in memory of the device(s) 104 and executable by one or more processors of the device(s) 104. The device(s) 104 may include any number and combination of cameras, controllers (e.g., flight controllers), sensors (e.g., thermal sensors, infrared sensors, accelerometers, pressure sensors, weather sensors, airflow sensors, proximity sensors, etc.), and systems (e.g., global positioning systems, navigation systems).

For example, and without limitation, an example IoT device 104(3) can be a smart refrigerator utilized by a user, who have registered the IoT device 104(3) to communicate with the service provider network 102, to replenish perishable items and/or otherwise access, computing resources in the form of accessing and storing data related to the consumer including, but not limited to, purchase history, item information, recipes, sensor data from the IoT device 104(3), replenishment plan, wish list, etc. The user, using the IoT device 104(3), may configure aspects of the operation of these computing resources, may access and utilize functionality provided by the various services, tools, environments, and systems described herein, and/or perform other types of functionality with regard to the operation of these and other computing resources provided by the service provider network 102. In some examples, a user may also register one or more edge device(s) 106 (e.g., a hub for security cameras and smart devices) to communicate with the service provider network 102, and the remote server(s) 108 may also push the latest ML model(s) 116 to the user's edge device(s) 106.

The computing devices utilized to configure and monitor the resources in the service provider network 102 (e.g., the edge device(s) 106) can be any type of computing device capable of connecting to the service provider network 102 via a suitable data communications network such as, but not limited to, a laptop or desktop computer, a tablet computing device, a server computer, or a smartphone.

As discussed briefly above, the service provider network 102 can be configured to execute various types of network services. For example, and without limitation, the service provider network 102 can implement a network of edge device(s) 106 and remote server(s) 108, which may be part of a network-based data processing and storage system. The service provider network 102 can be a network-based storage service that stores and maintains data on behalf of individual consumer or entity subscribers of the service provider network 102. The data stored by the edge device(s) 106 and/or remote server(s) 108 can be received from IoT devices 104 or from another source associated with one or more of the subscribers. In various examples, the service provider network 102 may geographically distribute the edge devices 106 to be close in proximity to the devices 104 to facilitate faster data collection.

The remote server(s) 108 may be configured to train machine learning models for the service provider network 102. The remote server(s) 108 may be any type of server, such as a network-accessible dedicated server or cloud server. In at least one example, the remote server(s) 108 may include components that may control the network of edge devices 106. For example, the remote server(s) 108 may include training data 114 to train one or more ML model(s) 116 to be pushed out to the edge device(s) 106.

The edge device(s) 106 may be configured to classify data (either incoming data 110, already-stored data 110, or both) as a type of data indicative of its relevance level. An edge device 106 can be any type of computing device capable of gathering data from the devices 104 for the service provider network 102 such as, but not limited to, a laptop or desktop computer, a tablet computing device, a server computer, or a smartphone. In some examples, the edge device(s) 106 may be separate from an uploading device that may receive the filtered data 112 to upload to the remote server(s) 108. In various examples, the edge device(s) 106 may be powerful enough to further train the ML model(s) 116 with received device data and dynamically determine whether the data 110 is impactful or not. In additional examples, the edge device(s) 106 may be a part of the IoT device(s) 104 itself.

In at least one example, the edge device(s) 106 may include components that may be used to filter data, received from the devices 104, to be transported to the remote server(s) 108. For example, the edge device(s) 106 may include one or more ML model(s) 116 and the filtering module 118.

The filtering module 118 may receive data 110 generated by the IoT devices 104 and process the data using the ML model(s) 116. In some examples, filtering module 118 may determine a relevance score for the data using the ML model(s) 116. The output of the machine learning model(s) 116—which processes unknown data 110 as a subject for classification—may include, inter alia, a classification of the unknown data 110 as a type of data among different types of data corresponding to different levels of relevance. The output may include additional information as well, such as an object type of the data object 110 that includes the "now-classified" data 110, a confidence level of the object type, and the like. Based on the relevance level of the data 110, the filtering module 118 may determine whether or not to upload the data to the remote server(s) 108. The edge device(s) 106 may transmit the filtered data 112 to the remote server(s) 108 without delay based on the relevance level of the filtered data 112 being high. Additionally, the edge device(s) 106 may identify an alternate data handling method for data 110 that was not yet uploaded based on the transport methods available for the location.

In some examples, if a filtered data object 112 is classified as the highest relevance level, the edge device(s) 106 may generate a highly compressed version of this filter data object 112 for faster transmission. That is, based on determining that the filtered data object 112 may be highly useful as training data, the edge device(s) 106 may transmit this highly compressed version of the filtered data object 112 to a human review queue and/or the remote server(s) 108 as soon as possible, then the standard version of the data object may be transmitted as usual to the remote server(s) 108. For example, if the ML model(s) 116 has determined that a particular video feed may be extremely useful as training data, thus classifying the particular video feed as the highest relevance level, the edge device(s) 106 may generate a highly compressed copy of the particular video feed to transmit to a human review queue and/or the remote server (s) 108.

Administrative users employed by the owner or operator of the service provider network 102, such as administrators managing the operation of the service provider network 102, can also connect with, manage, and utilize resources provided by network services executing within the service provider network 102 in a similar fashion. The administrative users may operate one or more devices associated with the service provider network 102, including one or more of the IoT device(s) 104, the edge device(s) 106, and the remote server(s) 108. In some examples, the administrative users may label the training data 114 to guide the ML models 116 to filter the raw data 110 from the IoT devices 104. In additional examples, the administrative users may receive and monitor both the raw data 110 received at the edge device(s) 106 and the subsequent filtered data 112 that is being received at the remote servers 108 to verify that the ML models 116 are correctly filtering data. In various examples, the administrative users may operate a human review queue to receive data classified as highest relevance level and/or a random sampling of data classified as other relevance level to review the data and to further label or otherwise modify the training data.

As a non-limiting example, the example image data 120 illustrates a small sample of data that may be included in data 110. The output of the machine learning model(s) 116—which processes unknown data 110 as a subject for classification—may include additional information as well, such as an object ID of the data object 110 that includes example classified data 122 and the example relevance score 124 for each example image data 120. In a first example, example image data 120(1) may be an image data of a fox that was incorrectly classified as object type "dog," and based on the low confidence score assigned, the ML model (s) 116 may output a higher example relevance score 124(1) for the example image data 120(1). In a second example, example image data 120(2) may be an image data of a lamb that was correctly classified as object type "sheep," and based on the higher confidence score assigned, the ML model(s) 116 may output a lower example relevance score 124(2) for the example image data 120(2). In the last example, example image data 120(N) may be an image data of a bicycle that was correctly classified as object type "bicycle," and based on the high confidence score assigned, the ML model(s) 116 may output an extremely low example relevance score 124(N) for the example image data 120(N). Based on the high relevance score, the example image data 120(1) may be included in the filtered data 112 to be transmitted to the remote server(s) 108 without further delay.

Figure 2A:
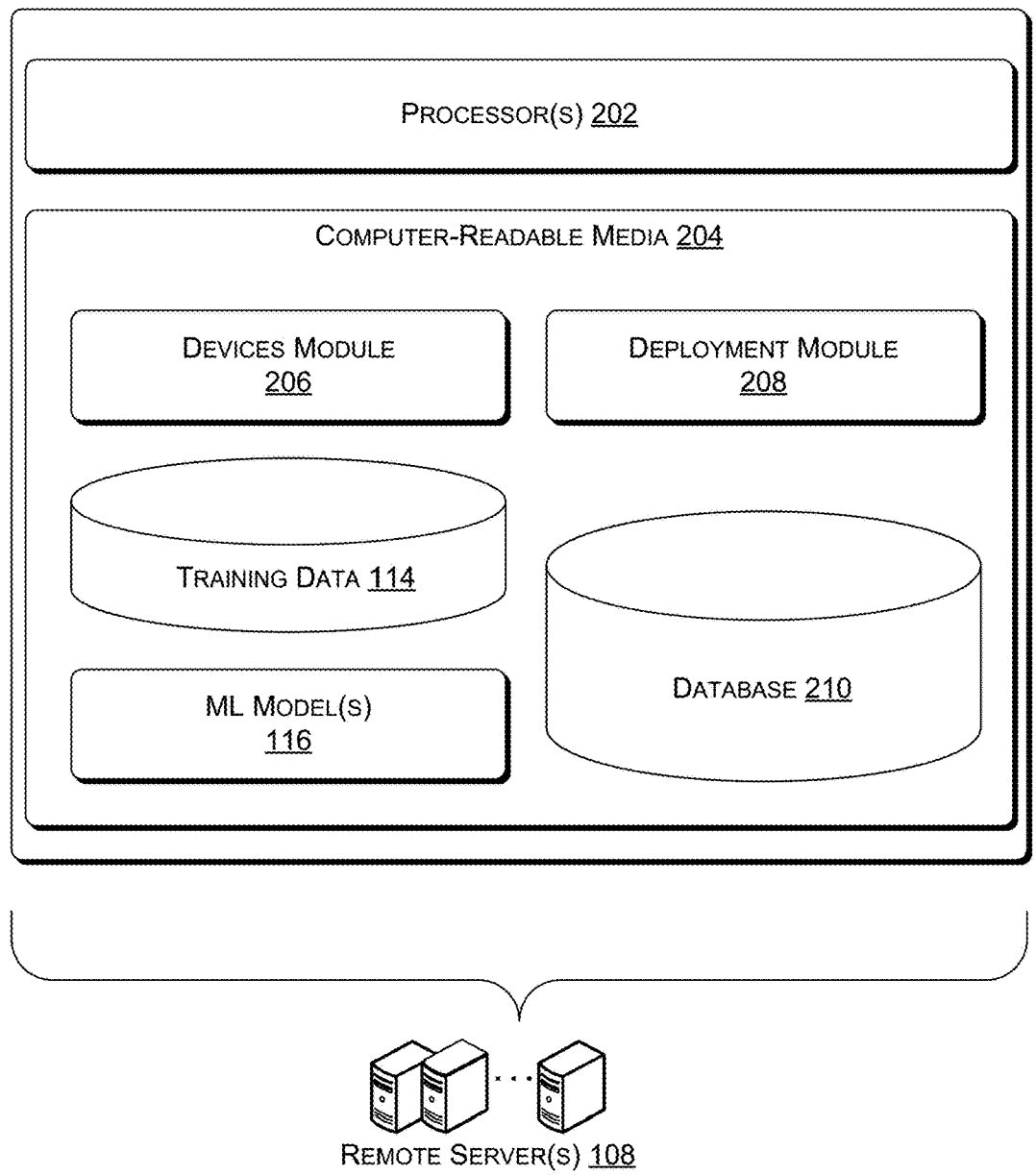
FIG. 2a is a block diagram of an illustrative computing architecture of the remote servers shown in FIG. 1.
Figure 2B:
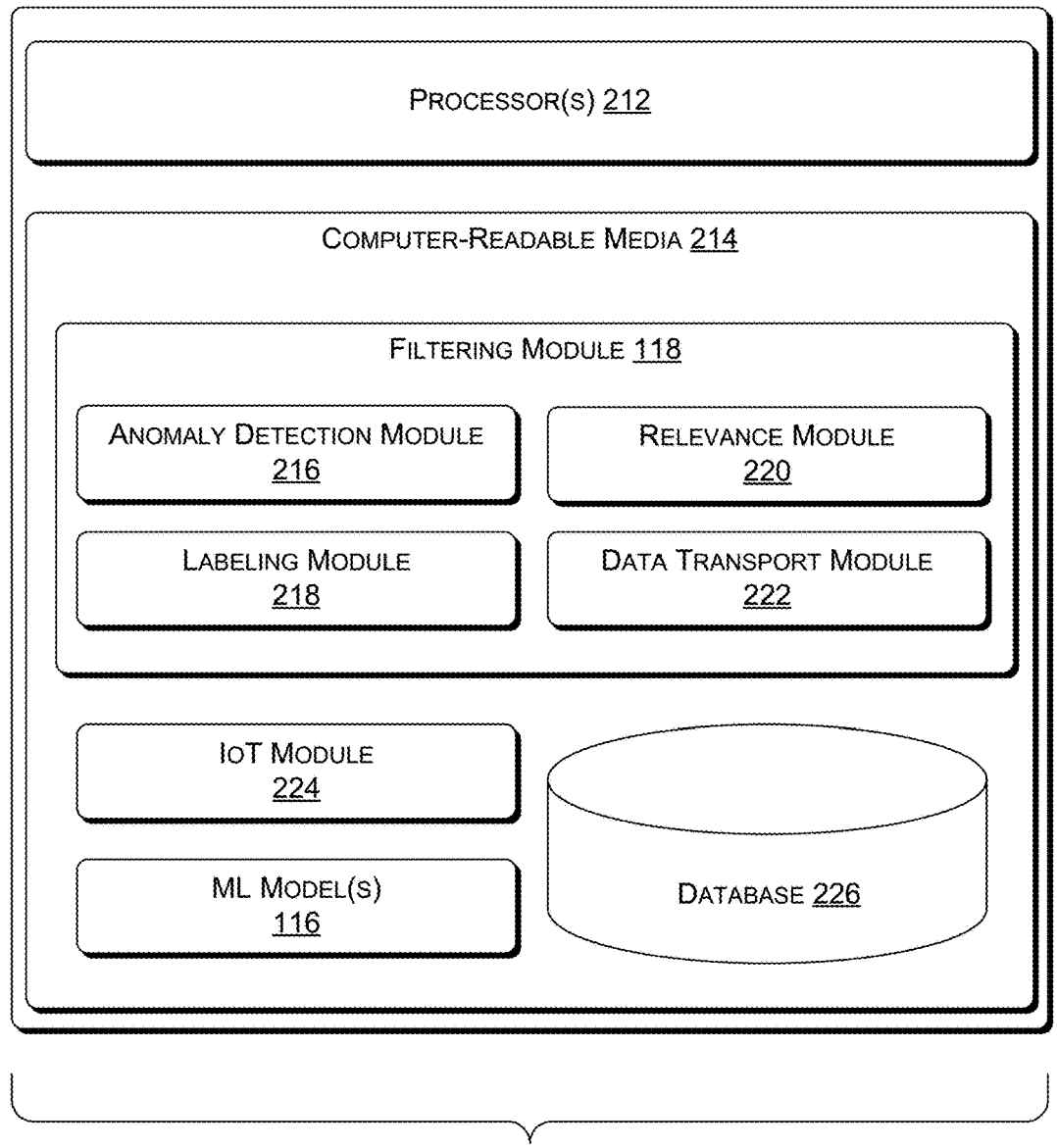
FIG. 2b is a block diagram of an illustrative computing architecture of the edge devices shown in FIG. 1.

FIG. 2*a* and FIG. 2*b* are block diagrams of an illustrative computing architecture 200*a* of the remote server(s) 108 and an illustrative computing architecture 200*b* of the edge device(s) 106, respectively. The computing architecture 200*a* and computing architecture 200*b* may each be implemented in a distributed or non-distributed computing environment.

The computing architecture 200*a* and computing architecture 200*b* may include one or more processors 202 and 212, and one or more computer-readable media 204 and 214 that stores various modules, applications, programs, or other data. The computer-readable media 204 and 214 may include instructions that, when executed by the one or more processors 202 and 212, respectively, cause the processors to perform the operations described herein for the system 100.

The computer-readable media 204 and 214 may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media appropriate for storing electronic instructions. In addition, in some examples the computer-readable media 204 and 214 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

As shown in FIG. 2a, in some configurations, the computer-readable media 204 may store the devices module 206, training data 114, the machine learning (ML) model(s) 116, the deployment module 208, and the database 210, which are described in turn. The components may be stored together or in a distributed arrangement.

The devices module 206 may manage and keep track of the network of IoT devices 104 and edge devices 106 that is authorized to feed training data into the remote servers(s) 108. In some examples, the devices module 206 may track the IoT devices 104 and the device type that feeds data into the edge devices 106, so that the ML model(s) 116 pushed to a particular edge device 106 may be tailored to the device type. For example, an edge device 106 that manages static consumer electronics at a user's home may not need all the ML model(s) 116 and/or data for autonomous vehicles and UAVs. Similarly, an edge device 106 located at a fulfillment warehouse that manages a fleet of delivery UAVs may not need the same ML model(s) 116 for road navigation and steering as an autonomous land vehicles, nor would it need all the same products information as a smart refrigerator may need.

The deployment module 208 may interact with the devices module 206 to push the latest ML model(s) 116 to the edge devices 106. As described above, not all edge devices 106 need the same ML model(s) 116 and data for every IoT device(s) 104, thus the deployment module 208 may push ML model(s) 116 and data as needed. Initially, the deployment module 208 may authorize the edge device(s) 106 and push the filtering module 118 and other components for the edge device(s) 106 to serve as a filtering device. In various examples, the deployment module 208 may verify authorization of the edge device(s) 106 before receiving data from the edge device(s) 106, and determine if the edge device(s) 106 needs to be updated. The deployment module 208 may also receive data from the edge device(s) 106 after verifying that the edge device(s) 106 has the correct version of ML model(s) 116 to gather useful data with. In additional examples, if the system uses a cascade of ML model(s) 116, the deployment module 208 may determine to push only specific updated ML model(s) 116. In some examples, the deployment module 208 may determine one or more data compression algorithm to push to the edge device(s) 106 to ensure that the remote server(s) 108 would have the correct decompression algorithm.

The remote server(s) 108 may have access to the IoT device(s) 104, the edge device(s) 106, and the data stored therein, for various purposes. One of these purposes is to create training data 114 for training one or more machine learning models 116 (sometimes referred to herein as "machine learning algorithms" 116). The training data 114 may be created by labeling (or tagging) samples of IoT data maintained by the edge device(s) 106 and/or the remote server(s) 108 within the service provider network 102. The labels applied to the samples of IoT data may indicate different types of data that correspond to different relevance levels of the samples of IoT data. For example, a first data object may include image data of a particularly aggressive and territorial animal that the system does not have a lot of images of may be highly relevant. This first data object may be labeled with a label such as "relevance level 1," "high relevance," or a score, value, code, or identifier that indicates this relevance level of the data in some way. In general, the different types of data with which the samples of IoT data can be labeled may span a spectrum of relevance. For example, a second data object may include data that may have some impact as training data but is not of highest impact. This second data object may be labeled with "relevance level 2," "medium relevance," or some other score, value, code, or identifier that indicates this relevance level of the data. Accordingly, a third data object may be labeled with a label such as "relevance level N," "low relevance," or a score, value, code, or identifier that indicates this relevance level of the data. It can be appreciated that these example types of data can be arranged in a hierarchy, or along a spectrum or continuum, in terms of the corresponding relevance levels of the types of data, and that there may be any number of different relevance levels (e.g., relevance levels 1-N) specifying a highest relevance level to a lowest relevance level, as an example. Thus, the training data 114 may include a corpus of IoT data samples with known relevance levels.

In some configurations, heuristics and similar mechanisms may be used to infer labels for the samples of IoT data in the process of create the training data 114 in an automated fashion. For instance, regression models may use a corpus of temperature data for different locations and time of the year and then label samples of IoT data that falls outside of the pattern of expected temperature. Other techniques, such as object recognition algorithm and/or facial recognition algorithms, may be used to automatically create the labeled training data 114.

Machine learning generally involves processing a set of examples (called "training data" 114) in order to train a machine learning model(s) 116. A machine learning model 116, once trained, is a learned mechanism that can receive new data as input and estimate or predict a result as output. For example, a trained machine learning model 116 can comprise a classifier that is tasked with classifying unknown input (e.g., an unknown image) as one of multiple class labels (e.g., labeling the image as a cat or a dog). In the context of the present disclosure, the unknown input may include, inter alia, data that is to be handled according to its level of relevance, and the trained machine learning model (s) 116 may be tasked with classifying the unknown input (a subject for classification) as one of multiple class labels. The unknown data may include an image(s), a video(s), multimedia, etc. Thus, the trained machine learning model(s) 116 may be configured with text recognition, image recognition, and other functionality to process unknown data with various types of content. The class labels, in this case, may correspond to a classification of the unknown data as a type of data among multiple different types of data corresponding to different relevance levels. The class labels can be directly indicative of the relevance, such as by including confidence level in the label itself (e.g., high confidence data, moderate confidence data, low confidence data, etc.). In an illustrative example, if a trained ML model(s) 116 labels a new image as a "dog" but has low confidence in this labeling, then the relevance level of this image may be high.

In some examples, particular ML model(s) 116 may specifically reside on the remote server(s) 108 to classify data and to determine if the data includes a new object. For example, a certain ML models machine learning model 116 can comprise k-Nearest Neighbors (kNN) classifier to classify the data received from the edge device(s) 106. Because a kNN classifier requires a large corpora of data to run, it would not be feasible to deploy this particular ML model(s) 116 to the smaller edge device(s) 106. Nonetheless, when the remote server(s) 108 receives data, from the edge device(s) 106, that was labeled as containing a new object type, the kNN classifier may verify the new object type. For example, the system may have only a few images of a particular type of bird, but the trained ML model(s) 116 that was pushed out to the edge device 106 may not include a class label for this particular type of bird because the few images is not enough data for the trained ML model(s) 116 to recognize it. However, when the data is received at the remote device(s) 108, the kNN classifier may determine that it has already seen this particular type of bird before but due to the low number of data samples, the system may have low confidence in its ability to correctly label this object.

In various examples, if the trained ML model(s) 116 has low confidence in its ability to correctly label an object an image data, this low confidence may increase the relevance score so that the system is prioritizing receiving this particular image data as training data. In additional examples, a ML model may increase the relevance score based on the object type detected in the image data if the ML model has determined that the system needs to collect more images of a certain object type or if it needs to collect more information of a certain object type. In a first example, if the system has high confidence in identifying "dogs" but low confidence in identifying "cats" in image data, then data that has been labeled as including object type "cat" may receive a higher relevance score. In a second example, if the system simply does not have a lot of images of a certain object type, a data object including this certain object type may receive a higher relevance score. In a third example, if the system has determined that a new fleet of UAVs in a certain area is being attacked by certain hawks during nesting season, even if the system is capable of identifying this certain type of hawk or has a lot of images of this type of hawk, it may still rank the image data and its associated GPS location data from the same time period as being highly relevant.

In some examples, the trained machine learning model(s) 116 may be configured to classify a set of data generated by different sensors of the same device into the same types of data at varying levels of relevance. For example, a UAV's performance may be highly affected by wind and weather, thus if conditions were extremely hot, cold, foggy, or windy, the data generated by temperature sensors, wind sensors, power sensors, and/or imaging devices may be similarly classified as highly relevant. That is, the classification of data generated by one sensor may cause the data generated by a different sensor on the same device to be higher on the relevance level.

The machine learning model(s) 116 may represent a single model or an ensemble of base-level machine learning models, and may be implemented as any type of machine learning model 116. For example, suitable machine learning models 116 for use with the techniques and systems described herein include, without limitation, tree-based models, k-Nearest Neighbors (kNN), support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models 116 whose outputs (classifications) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

As mentioned, the output of the machine learning model(s) 116—which processes unknown data as a subject for classification—may include, inter alia, a classification of the unknown data as a type of data among different types of data corresponding to different levels of relevance. The output may include additional information as well, such as an object ID of the data object that includes the "now-classified" data, an object name of the data object, and the like.

The database 210 may store at least some data including, but not limited to, data collected from devices module 206, ML model(s) 116 and deployment module 208, including data associated with IoT data, user data, device data, inventory data, and device specification data. In some examples, the data may be automatically added via a computing device (e.g., edge device(s) 106, remote server(s) 108). User data, device data, and inventory data may correspond to one or more consumer or entity subscribing to the service provider network 102. In various examples, user data may include information associated with the user such as the name, payment information, subscription information, the replenishment locations associated with the IoT devices, etc. The device data may also include feature details of each IoT device, the maintenance schedule, and in cases for autonomous vehicles, the task history. In additional or alternative examples, at least some of the data may be stored in a storage system or other data repository.

As shown in FIG. 2b, in some configurations, the computer-readable media 214 may store the filtering module 118 and associated components, the IoT module 224, the ML model(s) 116, and the database 226, which are described in turn. The components may be stored together or in a distributed arrangement.

The filtering module 118 may include the anomaly detection module 216, the labeling module 218, the relevance module 220, and the data transport module 222. The filtering module 118 may perform tasks related to data gathering, filtering, and transporting, and to receive data generated by the IoT device(s) 104. Additionally, the filtering module 118 may interact with the deployment module 208 of the remote server(s) 108 to receive the latest ML model(s) 116 or updates to one or more components of the filtering module 118. In at least one example, at least one or more components of the filtering module 118 may be stored and configured to execute at computing devices located at a data uploading location. For instance, the data transport module 222 running on a particular edge device 106 at a data uploading location may determine that particular data object should be queued up for uploading at a later time, thus that particular data object may be transferred locally to an uploading device also running the data transport module 222 to perform data handling.

The anomaly detection module 216 may use one or more ML model(s) 116 to determine if there are any anomaly in the data. In some examples, the anomaly detection module 216 may retrieve a set of "normal" baseline data for the device performing under similar circumstance to determine if the data indicate a normal range of performance and operation of the device's system resource as detected by the sensors. The baseline data may be historical data generated by the sensors on the device. Operation by the device's system resource as detected by the sensors that is outside of this normal range of performance and operation may be considered an anomaly. The anomaly detection module 216 may determine if an outlier data is caused by failure of the sensors or by extreme circumstances (e.g., high temperature measured on an unusually hot day) and refrain from uploading outlier data caused by system failure. In some examples, the anomaly detection module 216 may help determine if the device(s) 104 needs to be recalibrated.

The labeling module 218 may use one or more ML model(s) 116 to perform classification on data that can be labeled with class labels (e.g. image data). As described above, a trained ML model(s) 116 can comprise a classifier that is tasked with classifying unknown data (e.g., an unknown image) as one of multiple class labels (e.g., labeling the image as a cat or a dog). The unknown data may include an image(s), a video(s), multimedia, etc. Thus, the trained machine learning model(s) 116 may be configured with text recognition, image recognition, and other functionality to process unknown data with various types of content. The labeling module 218 may determine a confidence score for the class label, where a lower confidence score indicates a lower likelihood that the class label is correct for the data.

The relevance module 220 may use one or more trained ML model(s) 116 to determine the system's priority to upload the data by determining a relevance score or level for the data. A higher relevant score or level indicates a higher priority in having the data uploaded to the remote server(s) 108. In some examples, the relevance module 220 may batch certain sets of data generated by different sensors at the same time period from the same IoT device to be sent to the remote server(s) 108. In some examples, the relevance module 220 may interact with the labeling module 218 to assign a higher relevance score based on a low level of confidence on a class label for data.

The data transport module 222 may determine when and where to upload the IoT data based on the methods available to the edge device(s) 106. The data transport module 222 may determine to upload the data to the remote server(s) 108 without delay based on the data being classified as the highest relevance level. In some examples, if the data is classified as the highest relevance level, the data transport module 222 may first generate a highly compressed version of the data to get a version of this data to the human review queue and/or remote server(s) 108 as quickly as possible. If the current edge device 106 is incapable performing the data transmission to the remote server(s) 108 (e.g., due to lack of wide area network connectivity), the data transport module 222 may transfer the data to a local uploading device to complete the data transfer.

In some examples, if the data is classified as less than highest but not the lowest level of relevance, the data transport module 222 may determine to transfer the data to an uploading device with a data transfer queue for delayed transmission. The data transport module 222 running on an uploading device may slowly feed data from the queue or it may wait to initiate data transfer during slower network activity time period such as late night or weekends or it. In various examples, at the lowest level of relevance, the data transport module 222 may determine to store the data onto a storage device. The data transport module 222 may determine whether the storage device may be kept at the current facility or may be transported to storage facility to keep the data for possible future use or may be transported to the physical location of the remote server(s) 108 to be uploaded locally.

The IoT module 224 may manage and track the IoT devices 104 that it receives data from. The data generated by the IoT device 104 may be transferred by any communication channel or by swapping out the data storage unit (e.g., memory card, solid state hard drive, etc.) on IoT device 104. Initially, the IoT module 224 may serve as a device manager to authorize and register IoT device(s) 104. In some examples, IoT module 224 may provide software updates, received from remote server(s) 108, to the IoT device(s) 104. In various examples, IoT module 224 may store data specific to the IoT device(s) 104 for baseline data and device calibration.

The ML model(s) 116 may be used for anomaly detection, classifying data objects by class labels, and classifying data by its relevance level. The ML model(s) 116 may be received from the remote server(s) 108. In some examples, the edge device(s) 106 may be part of a larger system that is powerful enough to train ML model(s) 116 that can dynamically determine if the data generated by the IoT device(s) 104 are useful as training data.

The database 226 may store at least some data including, but not limited to, data collected from anomaly detection module 216, labeling module 218, relevance module 220, data transport module 222, and ML model(s) 116 including data associated with IoT data, user data, inventory data, and device specification data. In some examples, the data may be automatically added via a computing device (e.g., remote server(s) 108). IoT data, user data, and inventory data may correspond to one or more IoT device(s) 104 associated with a user registered with the service provider network. In various examples, user data may include information associated with a registered user such as the name, payment information, subscription information, shipping information, the replenishment locations, etc. The topology data may include all the information related to the topology, including the sites, the location of the sites, the devices assigned to each site, and the items mapping. The inventory data may include the inventory level being tracked by a device 104 and the items index including any expiration date that is being tracked. The items data may include catalog of items offered through the service provider. The items data may also include feature details of each item, the price, and the ratings for the item. In additional or alternative examples, at least some of the data may be stored in a storage system or other data repository.

Figure 3:
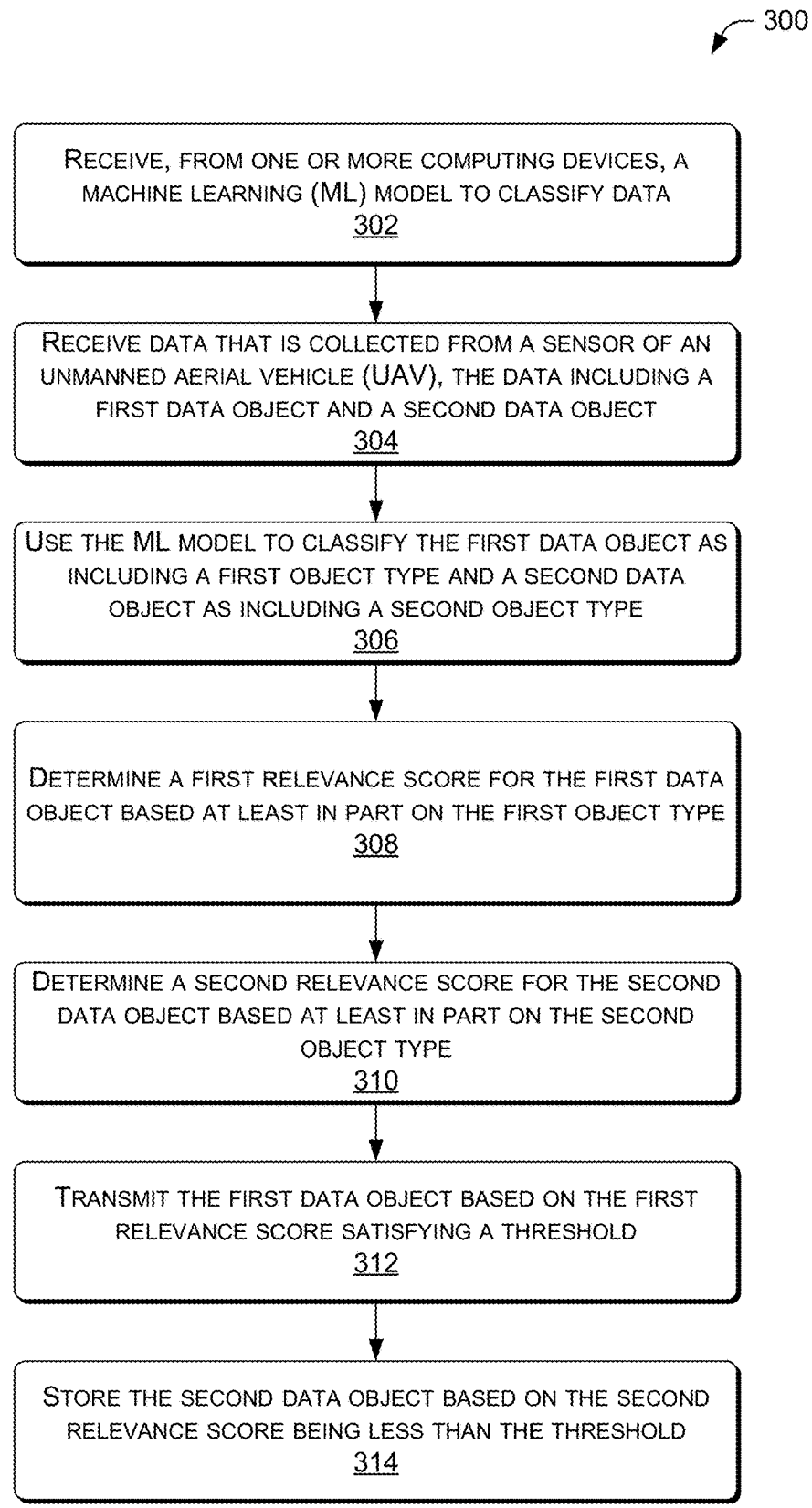
FIG. 3 is a flow diagram of an illustrative process for data collecting and filtering using a machine learning model.
Figure 4:
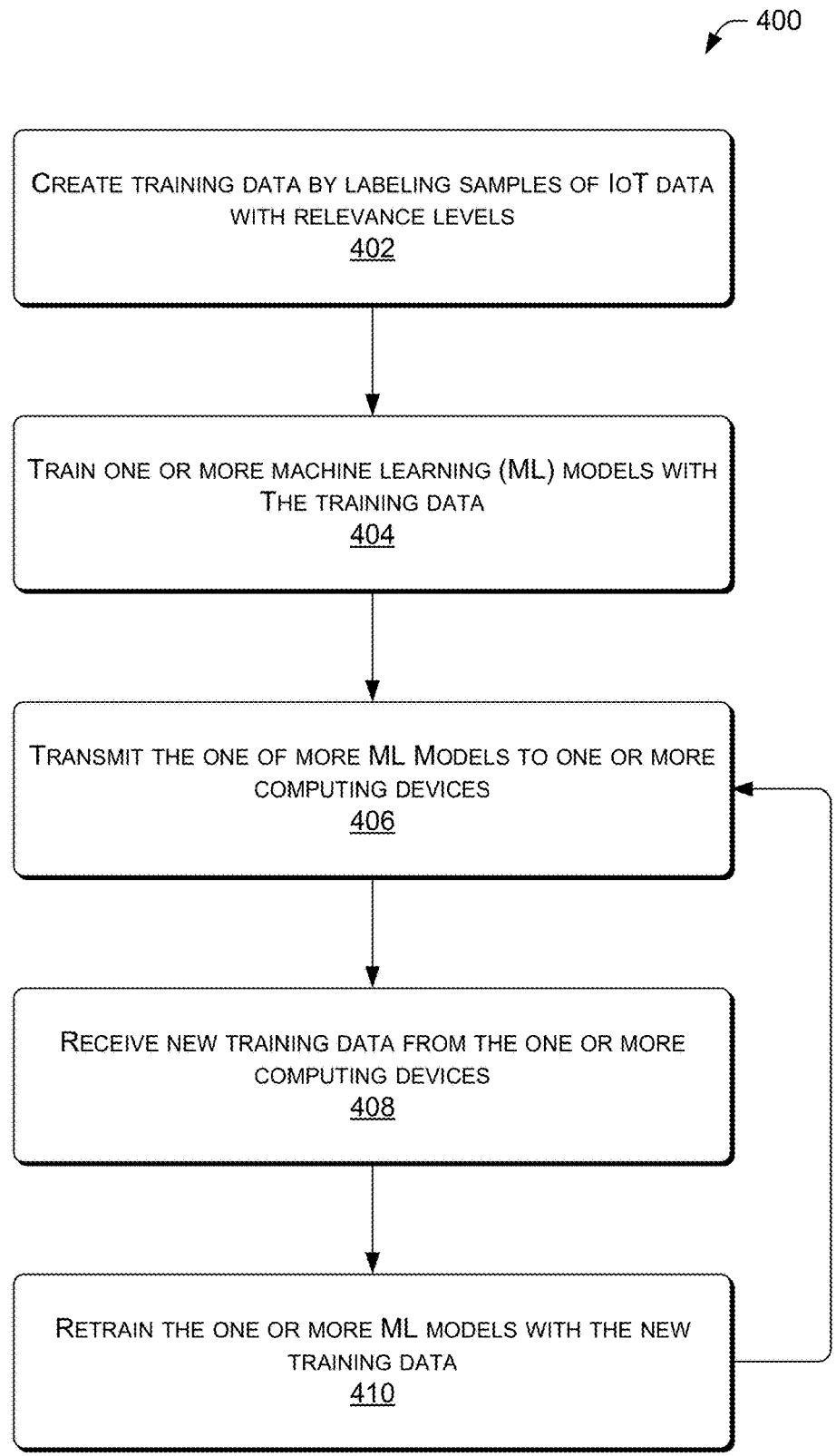
FIG. 4 is a flow diagram of an illustrative process for training machine learning models to filter data and to retrain the machine learning models.
Figure 6:
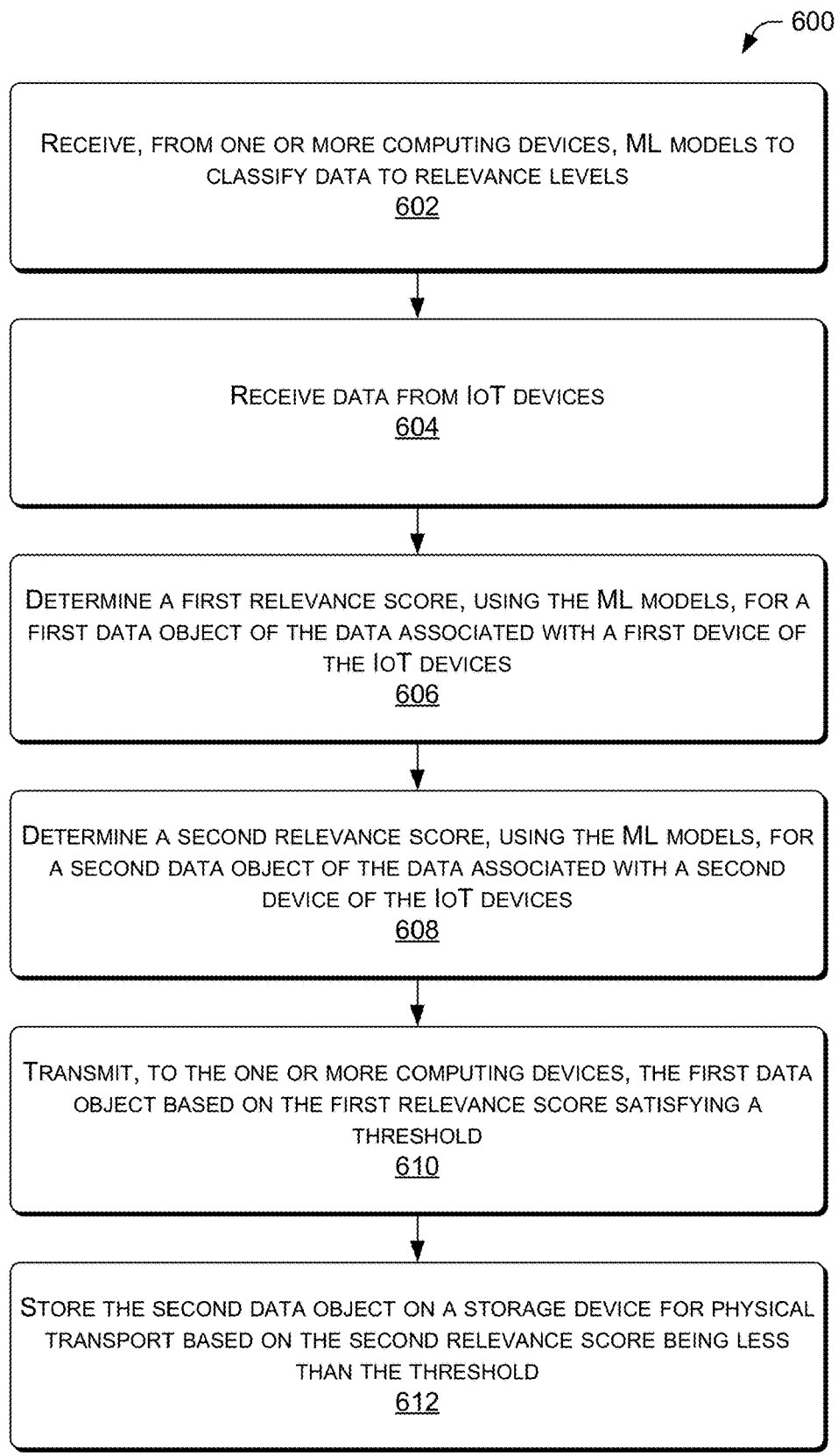
FIG. 6 is a flow diagram of an illustrative process for using a machine learning model to determine the relevance score of collected data and determining the data transport for the data based on its relevance.

FIGS. 3, 4, and 6 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 3 is a flow diagram of an illustrative process 300 data collecting and filtering using a machine learning model. The process 300 is described with reference to the system 100 and may be performed by the edge device(s) 106 and/or in cooperation with any one or more of the remote server(s) 108. Of course, the process 300 may be performed in other similar and/or different environments.

At 302, the filtering module 118 may receive, from one or more computing devices, the ML model(s) to classify image data. The current edge device(s) 106 may register itself with a remote server(s) 108 to receive the latest version of the ML model(s) 116 to determine if the data gathered by the edge device(s) 106 may be useful or having an impact as training data.

At 304, the IoT module 224 may receive data that is collected from a sensor of an unmanned aerial vehicle (UAV). The data may be image data and may include a first data object and a second data object. The data generated by the IoT device 104 may be directly transferred from the IoT device by any communication channel or by swapping out the data storage unit (e.g., memory card, solid state hard drive, etc.) on IoT device 104. The IoT device 104 may have one or more sensors generating the data. The first data object and second data object may be generated by the same sensor but at different time periods or by two different sensors.

At 306, the labeling module 218 may use the ML model to classify the first data object as including a first object type and a second data object as including a second object type. The labeling module 218 may use a trained ML model(s) 116 comprising a classifier that is tasked with classifying the image data as one of multiple class labels (e.g., labeling the image as a cat or a dog). The trained machine learning model(s) 116 may be configured with text recognition, image recognition, and other functionality to process unknown data with various types of content.

At 308, the labeling module 218 and relevance module 220 may determine a first relevance score for the first data object based at least in part on the first object type. Initially, the labeling module 218 may use a trained ML model(s) 116 comprising a classifier that is tasked with classifying the image data as one of multiple class labels. The labeling module 218 may determine a confidence level for the class label, where a lower confidence level indicates a lower likelihood that the class label is correct for the image data. In some examples, if the ML model has low confidence in its ability to correctly label an object in the image data, the low confidence may increase the relevance score to push this particular data file for additional analysis. In various examples, a ML model may increase the relevance score based on the object type detected in the image data if the ML model has determined that the system needs to collect more images of a certain object type or if it needs to collect more information of a certain object type. In a first example, if the system has high confidence in identifying "dogs" but low confidence in identifying "cats" in image data, then data that has been labeled as including object type "cat" may receive a higher relevance score. In a second example, if the system simply does not have a lot of images of a certain object type, a data object including this certain object type may receive a higher relevance score. In a third example, if the system has determined that a new fleet of UAVs in a certain area is being attacked by certain hawks during nesting season, even if the system is capable of identifying this certain type of hawk or has a lot of images of this type of hawk, it may still rank the image data and its associated GPS location from the same time period as being relevant.

At 310, the labeling module 218 and relevance module 220 may determine a first relevance score for the first data object based at least in part on the first object type. The relevance module 220 may use one or more trained ML model(s) 116 to determine the system's priority to upload the image data by determining a relevance score or level for the image data. A higher relevant score or level indicates a higher priority in having the data uploaded to the remote server(s) 108. In some examples, the relevance module 220 may batch certain sets of data generated by different sensors at the same time period from the same IoT device to be sent to the remote server(s) 108. In some example, the relevance module 220 may interact with the labeling module 218 to assign a higher relevance score based on a low level of confidence on a class label for data.

At 312, the data transport module 222 may transmit first data object based on the first relevance score satisfying a threshold. The data transport module 222 may determine when and where to upload the IoT data based on the methods available to the edge device(s) 106. The data transport module 222 may determine to upload the data to the remote server(s) 108 without delay based on the data being classified as the highest level of relevance or satisfying a high relevance threshold. If the current edge device 106 is incapable performing the data transmission to the remote server(s) 108 (e.g., due to lack of wide area network connectivity), the data transport module 222 may transfer the data to a local uploading device to complete the data transfer. As described above, the system may determine certain data object may have more impact as training data and assign the data object a high relevance score so that this data object may be transmitted to the remote server to be processed without delay.

At 314, the data transport module 222 may store the second data object based on the second relevance score being less than the threshold. The data transport module 222 may determine to store the data object first, then handle its storage and transport according to its relevance score. In some examples, if the data is classified as less than highest but not the lowest level of relevance, the data transport module 222 may determine to transfer the data to an uploading device with a data transfer queue for delayed transmission. The data transport module 222 running on an uploading device may slowly feed data from the queue or it may wait to initiate data transfer during slower network activity time period such as late night or weekends or it. In various examples, at the lowest level of relevance, the data transport module 222 may determine to store the data onto a storage device. The data transport module 222 may determine whether the storage device may be kept at the current facility or may be transported to storage facility to keep the data for possible future use or may be transported to the physical location of the remote server(s) 108 to be uploaded locally.

FIG. 4 is a flow diagram of an illustrative process 400 for training machine learning models to filter data and to retrain the machine learning models. The process 400 is described with reference to the system 100 and may be performed by the edge device(s) 106 and/or in cooperation with any one or more of the remote server(s) 108. Of course, the process 400 may be performed in other similar and/or different environments.

At 402, the remote server(s) 108 may receive training data including first training data created by labeling samples of data with relevance levels. The training data 114 may be created by labeling (or tagging) samples of IoT data maintained by the edge device(s) 106 and/or the remote server(s) 108 within the service provider network 102. The labels applied to the samples of IoT data may indicate different types of data that correspond to different relevance levels of the samples of IoT data. For example, a first data object may include image data of a particularly aggressive and territorial animal that the system does not have a lot of images of may be highly relevant. This first data object may be labeled with a label such as "relevance level 1," "high relevance," or a score, value, code, or identifier that indicates this relevance level of the data in some way. In general, the different types of data with which the samples of IoT data can be labeled may span a spectrum of relevance. For example, a second data object may include data that may have some impact as training data but is not of highest impact. This second data object may be labeled with "relevance level 2," "medium relevance," or some other score, value, code, or identifier that indicates this relevance level of the data. Accordingly, a third data object may be labeled with a label such as "relevance level N." "low relevance," or a score, value, code, or identifier that indicates this relevance level of the data. It can be appreciated that these example types of data can be arranged in a hierarchy, or along a spectrum or continuum, in terms of the corresponding relevance levels of the types of data, and that there may be any number of different relevance levels (e.g., relevance levels 1-N) specifying a highest relevance level to a lowest relevance level, as an example. Thus, the training data 114 may include a corpus of IoT data samples with known relevance levels.

At 404, the deployment module 208 may train one or more machine learning (ML) models with the first training data. In at least one example, machine learning generally involves processing a set of examples (called "training data" 114) in order to train a machine learning model(s) 116. A machine learning model 116, once trained, is a learned mechanism that can receive new data as input and estimate or predict a result as output. For example, a trained machine learning model 116 can comprise a classifier that is tasked with classifying unknown input (e.g., an unknown image) as one of multiple class labels (e.g., labeling the image as a cat or a dog). In the context of the present disclosure, the unknown input may include, inter alia, data that is to be handled according to its level of relevance, and the trained machine learning model(s) 116 may be tasked with classifying the unknown input (a subject for classification) as one of multiple class labels. The unknown data may include an image(s), a video(s), multimedia, etc. Thus, the trained machine learning model(s) 116 may be configured with text recognition, image recognition, and other functionality to process unknown data with various types of content. The class labels, in this case, may correspond to a classification of the unknown data as a type of data among multiple different types of data corresponding to different relevance levels. The class labels can be directly indicative of the relevance, such as by including confidence level in the label itself (e.g., high confidence data, moderate confidence data, low confidence data, etc.). In an illustrative example, if a trained ML model(s) 116 labels a new image as a "dog" but has low confidence in this labeling, then the relevance level of this image may be high.

At 406, the deployment module 208 may transmit the one of more ML models to one or more computing devices. In various examples, deployment module 208 may interact with the devices module 206 to push the latest ML model(s) 116 to the edge devices 106. The devices module 206 may manage and keep track of the network of IoT devices 104 and edge devices 106 that is authorized to feed training data into the remote servers(s) 108. In some examples, the devices module 206 may track the IoT devices 104 and the device type that feeds data into the edge devices 106, so that the ML model(s) 116 pushed to a particular edge device 106 may be tailored to the device type.

At 408, the deployment module 208 may receive new training data from the one or more computing devices. The deployment module 208 may verify authorization of the edge device(s) 106 and determine if the edge device(s) 106 needs to be updated. In some examples, the deployment module 208 may also receive data from the edge device(s) 106 after verifying that the edge device(s) 106 has the correct version of ML model(s) 116 to gather useful data with.

At 410, the remote server(s) 108 may retrain the one or more ML models with the new training data. The machine learning model 116, once trained, is a learned mechanism that can receive new data as input and estimate or predict a result as output. Additionally, the machine learning model 116 may return to process 406 to transmit the latest trained ML model(s) 116 to edge device(s) 106, receive new training data back from the edge device(s) 106, and retrain the ML model(s) 116 to continuously improve the ML models 116 in this data processing loop.

Figure 5:
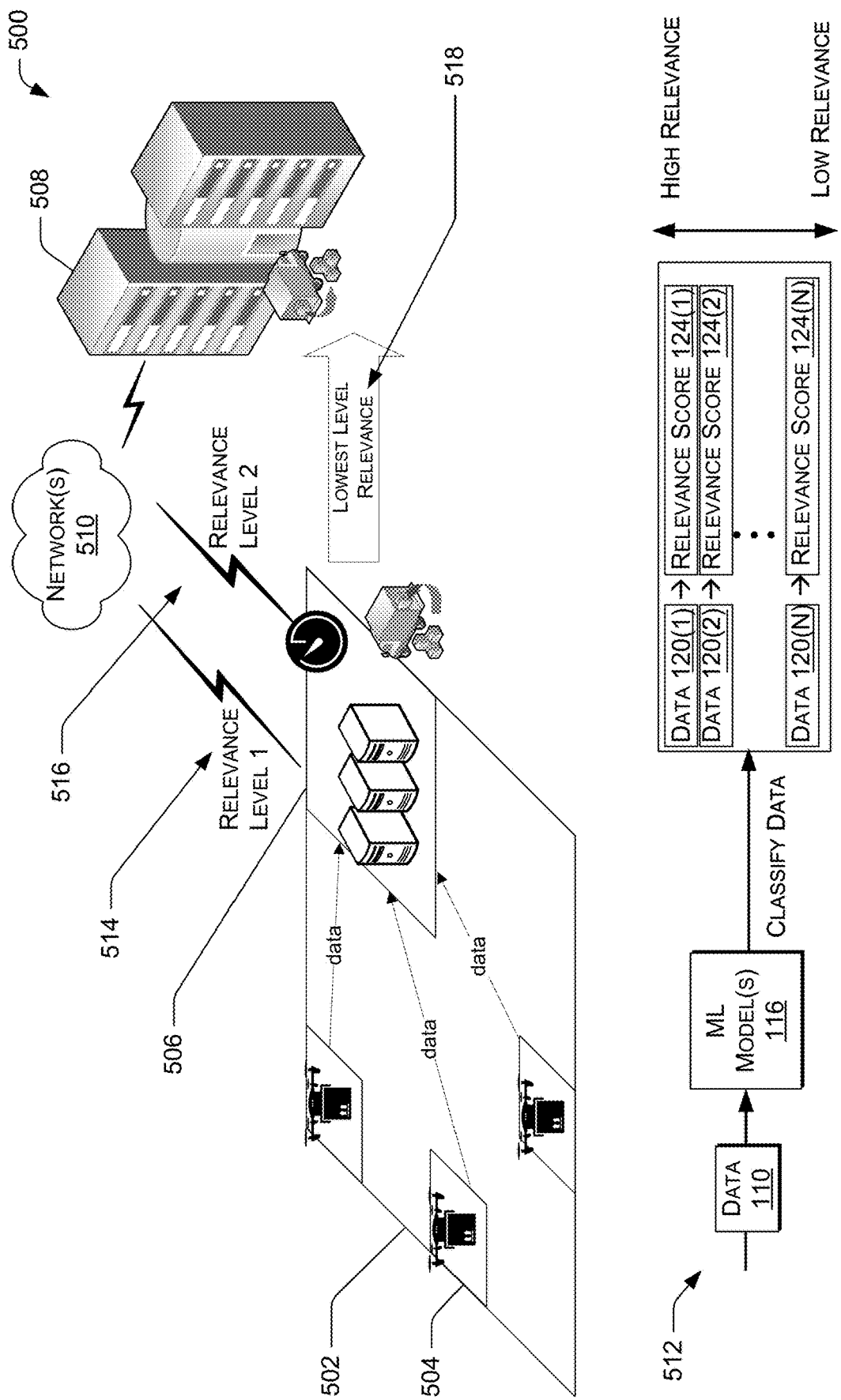
FIG. 5 is a schematic diagram showing an example data processing pipeline for a fulfillment warehouse having a fleet of UAVs.

FIG. 5 is a schematic diagram showing example data processing pipeline 500 of a fulfillment warehouse using a fleet of UAVs with data generated by the UAVs being collected. The example data processing pipeline 500 is a non-limiting example how the data generated by the UAVs may be collected and filtered by the filtering module 118 running on the edge device(s) 106. The example data processing pipeline 500 may include the example fulfillment warehouse 502, the example landing platform 504, the example computing center 506, the example data center 508, the example data classification 512, the example highest relevance level 514, the example medium relevance level 516, and the example lowest relevance level 518.

The example fulfillment warehouse 502 may include a fleet of delivery UAVs, the example landing platform 504, and the example computing center 506. Although only example landing platform 504 is labeled, a fulfillment warehouse may have any number of UAVs and landing platforms to service the UAVs. In this example, a UAV may land on example landing platform 504 and the data storage device storing IoT data generated by the UAV during the last flight may be removed and swapped for a new data storage device. The data storage device containing the IoT data may be delivered to the example computing center 506 to upload the data to the edge device(s) 106. The filtering module 118 running on the edge device(s) 106 may determine whether to upload the data to remote servers located at the example data center 508. In this example, the example data center 508 is both the cloud server and the remote data storage warehouse, but the cloud and data storage warehouse may be two separate locations.

In the example data classification 512, the filtering module 118 may use ML model(s) 116 to classify the data 110 into classified data 120 with relevance score 124. The example image data 120 illustrates a small sample of data that may be included in data 110. The output of the machine learning model(s) 116—which processes unknown data 110 as a subject for classification—may include additional information as well, such as an object ID of the data object 110 that includes example classified data and the example relevance score 124 for each example image data 120. The first data object 120(1) may include data of a particularly aggressive and territorial animal that the system does not have a lot of images of may be highly relevant. This first data object may be labeled with a label such as "relevance level 1," or a score, value, code, or identifier that indicates this relevance level of the data in some way. In a second example, example image data 120(2) may be an image data that may be less useful, thus the ML model(s) 116 may output a lower example relevance score 124(2), "relevance level 2," for the example image data 120(2). In the last example, for example image data 120(N), the ML model(s) 116 may output an extremely low example relevance score 124(N) "relevance level N." It can be appreciated that these example types of data can be arranged in a hierarchy, or along a spectrum or continuum, in terms of the corresponding relevance levels of the types of data, and that there may be any number of different relevance levels (e.g., relevance levels 1-N) specifying a highest relevance level to a lowest relevance level, as an example. Thus, the training data 114 may include a corpus of IoT data samples with known relevance levels.

The example highest relevance level 514 may be data classified as the highest level of relevance and may be uploaded to the remote server(s) 108 using the fastest data transport method available. The data transport module 222 may generate a highly compressed version of the data to get the information from this data to a review queue and/or remote server(s) 108 as quickly as possible. The data transport module 222 may determine to upload the other copy of the data to the remote server(s) 108 without delay based on the data being classified as the highest level of relevance. If the current edge device 106 is incapable performing the data transmission to the remote server(s) 108 (e.g., due to lack of wide area network connectivity), the data transport module 222 may transfer the data to a local uploading device to complete the data transfer.

The example medium relevance level 516 may the data that is classified as less than highest but not the lowest level of relevance. The data transport module 222 may determine to transfer the data to an uploading device with a data transfer queue for delayed transmission. The data transport module 222 running on an uploading device may slowly feed data from the queue or it may wait to initiate data transfer during slower network activity time period such as late night or weekends or it.

The example lowest relevance level 518 may be at the lowest level of relevance such that the data transport module 222 may determine to store the data onto a storage device. The data transport module 222 may determine whether the storage device may be kept at the current facility or may be transported to storage facility to keep the data for possible future use or may be transported to the physical location of the remote server(s) 108 to be uploaded locally.

FIG. 6 is a flow diagram of an illustrative process 600 for using a machine learning model to determine the relevance score of collected data and determining the data transport for the data based on its relevance. The process 600 is described with reference to the system 100 and may be performed by the edge device(s) 106 and/or in cooperation with any one or more of the remote server(s) 108. Of course, the process 600 may be performed in other similar and/or different environments.

At 602, the filtering module 118 may receive, from one or more computing devices, ML models to classify data to relevance levels. The current edge device(s) 106 may register itself with a remote server(s) 108 to receive the latest version of the ML model(s) 116 to help determine if the data gathered by the edge device(s) 106 may be useful as training data.

At 604, the IoT module 224 may receive data from IoT devices. The IoT module 224 may receive image data that is collected from an image sensor of a UAV. The data generated by the IoT device 104 may be directly transferred from the device by any communication channel or by swapping out the data storage unit (e.g., memory card, solid state hard drive, etc.) on IoT device 104.

At 606, relevance module 220 may determine a first relevance score, using the ML models, for a first data object of the data associated with a first device of the IoT devices. The relevance module 220 may use one or more trained ML model(s) 116 to determine the system's priority to upload the data by determining a relevance score or level for the data. A higher relevant score or level indicates a higher priority in having the data uploaded to the remote server(s) 108. In some examples, the relevance module 220 may batch certain sets of data generated by different sensors at the same time period from the same IoT device to be sent to the remote server(s) 108. In some example, the relevance module 220 may interact with the labeling module 218 to assign a higher relevance score based on a low level of confidence on a class label for data.

At 608, relevance module 220 may determine a second relevance score, using the ML models, for a second data object of the data associated with a second device of the IoT devices. As described above, the relevance module 220 may use one or more trained ML model(s) 116 to determine the system's priority to upload the data by determining a relevance score or level for the data. A higher relevant score or level indicates a higher priority in having the data uploaded to the remote server(s) 108.

At 610, the data transport module 222 may transmit, to the one or more computing devices, the first data object based on the first relevance score satisfying a threshold. The data transport module 222 may determine when and where to upload the IoT data based on the methods available to the edge device(s) 106. The data transport module 222 may determine to upload the data to the remote server(s) 108 without delay based on the data being classified as the highest level of relevance or satisfying a high relevance threshold. If the current edge device 106 is incapable of performing the data transmission to the remote server(s) 108 (e.g., due to lack of wide area network connectivity), the data transport module 222 may transfer the data to a local uploading device to complete the data transfer.

At 612, the data transport module 222 may store the second data object on a storage device for physical transport based on the second relevance score being less than the threshold. In some examples, if the data is classified as not satisfying a high relevance threshold, it may fall in some spectrum of relevance and may be handled based on where it falls. If the data is classified as less than the highest but not the lowest level of relevance, the data transport module 222 may determine to transfer the data to an uploading device with a data transfer queue for delayed transmission. The data transport module 222 running on an uploading device may slowly feed data from the queue, or it may wait to initiate data transfer during slower network activity time periods such as late at night or on weekends or it. In various examples, at the lowest level of relevance, the data transport module 222 may determine to store the data onto a storage device. The data transport module 222 may determine whether the storage device may be kept at the current facility or may be transported to a storage facility to keep the data for possible future use, or may be transported to the physical location of the remote server(s) 108 to be uploaded locally.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
memory storing computer-executable instructions that, when executed, cause the one or more processors to:
receive first training data including one or more labeled samples of data with one or more relevance scores, wherein the one or more relevance scores indicate a priority of receiving new data as additional training data and the priority is used to determine a data transport method;
train a first machine learning (ML) model with the first training data, wherein the first ML model classifies input data to determine an object type detected in the input data and a first relevance score associated with the object type;
transmit the first ML model to a computing device;
receive second training data transmitted from the computing device;
train a second ML model with the second training data, wherein the second ML model classifies data to determine that a second relevance score associated with the object type is lower than the first relevance score based at least in part on a confidence level associated with a correct determination of the object type; and
receive third training data transmitted from the computing device, wherein the third training data is associated with a third relevance score indicating a lower priority of receiving the third training data than the second training data.

2. The system as recited in claim 1, wherein the computer-executable instructions, when executed, further cause the one or more processors to transmit the second ML model to the computing device to replace the first ML model.

3. The system as recited in claim 1, wherein the second training data and at least a portion of the third training data were received at the computing device during a same time period, and the third training data was received after the second training data based at least in part on the priority used to determine the data transport method.

4. The system as recited in claim 1, wherein the computing device receives sensor data from an IoT device, and the computing device is a standalone device apart from the IoT device or an incorporated device with the IoT device.

5. The system as recited in claim 4, wherein the IoT device includes at least one of a temperature sensor, an audio sensor, a wind sensor, or an image sensor.

6. A computer-implemented method comprising:
receiving first training data including one or more labeled samples of data with one or more relevance scores, wherein the one or more relevance scores indicate a priority of receiving new data as additional training data;
training a first machine learning (ML) model with the first training data, wherein the first ML model classifies input data to determine an object type detected in the input data and a first relevance score associated with the object type;
transmitting the first ML model to a computing device;
receiving second training data transmitted from the computing device;
training a second ML model with at least the second training data, wherein the second ML model classifies data to determine that a second relevance score associated with the object type is lower than the first relevance score based at least in part on a confidence level associated with a correct determination of the object type; and
receiving third training data transmitted from the computing device, wherein the second training data and at least portion of the third training data were received at the computing device during a same time period.

7. The computer-implemented method as recited in claim 6, wherein the second training data was received from the computing device at a first time and the third training data was received from the computing device at a second time after the first time, and wherein the third training data is associated with a third relevance score indicating a lower priority for receiving the third training data than the second training data.

8. The computer-implemented method as recited in claim 6, wherein receiving the second training data further includes determining a version of ML model used to generate the second training data.

9. The computer-implemented method as recited in claim 6, wherein the computing device receives sensor data from an IoT device, wherein the computing device includes one of a standalone device apart from the IoT device or an incorporated device with the IoT device.

10. The computer-implemented method as recited in claim 9, wherein the IoT device includes a temperature sensor.

11. The computer-implemented method as recited in claim 9, wherein the IoT device includes an audio sensor.

12. The computer-implemented method as recited in claim 9, wherein the IoT device includes a wind sensor.

13. The computer-implemented method as recited in claim 9, wherein the IoT device includes an image sensor.

14. One or more non-transitory computer-readable media storing computer executable instructions that, when executed, cause one or more processors to perform operations comprising:
receiving first training data including one or more labeled samples of data with one or more relevance scores, the one or more relevance scores indicating a priority of receiving new data as additional training data;
training a first machine learning (ML) model with the first training data, the first ML model to classify data to determine an object type detected in the data and a first relevance score associated with the object type;
transmitting the first ML model to a computing device;
receiving second training data transmitted from the computing device;
training a second ML model with at least the second training data, wherein the second ML model classifies data to determine a second relevance score associated with the object type is lower than the first relevance score based at least in part on a confidence level associated with a correct determination of the object type; and receiving third training data transmitted from the computing device, wherein the second training data and a portion of the third training data were received at the computing device during a same time period.

15. The one or more non-transitory computer-readable media as recited in claim 14, wherein the operations further comprise transmitting the second ML model to the computing device to replace the first ML model.

16. The one or more non-transitory computer-readable media as recited in claim 14, wherein the computing device is incorporated with an IoT device.

17. The one or more non-transitory computer-readable media as recited in claim 14, wherein transmitting the first ML model further includes transmitting one or more anomaly detectors.

18. The one or more non-transitory computer-readable media as recited in claim 14, wherein transmitting the first ML model further includes transmitting instructions for data transport.

19. The one or more non-transitory computer-readable media as recited in claim 18, wherein the instructions for the data transport are based at least in part on the one or more relevance scores indicating the priority of receiving the new data as the additional training data.

20. The one or more non-transitory computer-readable media as recited in claim 14, wherein the third training data was received at a time after the second training data was received based at least in part on the relevance scores indicating the priority of receiving the third training data is lower than the second training data.

* * * * *